(12) United States Patent
Hirano et al.

(10) Patent No.: US 6,392,173 B1
(45) Date of Patent: May 21, 2002

(54) AUTOMATIC SWITCHOVER DEVICE FOR POWER SOURCE

(75) Inventors: Tsutomu Hirano; Koichi Asai; Hiroyuki Eguchi, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,135

(22) Filed: Aug. 21, 2001

(30) Foreign Application Priority Data

Aug. 25, 2000 (JP) ........................................ 2000-260885

(51) Int. Cl.$^7$ ................................................. H01H 1/24
(52) U.S. Cl. ....................................................... 200/245
(58) Field of Search ................................. 200/5 R, 175, 200/238, 245, 246, 247, 250, 257, 259, 260, 282, 283, 290

(56) References Cited

U.S. PATENT DOCUMENTS 5,638,948 A * 6/1997 Sharaf et al. ............... 200/401
5,977,500 A * 11/1999 Mohtasham ................ 200/574

FOREIGN PATENT DOCUMENTS

JP 5-64382 3/1993

* cited by examiner

*Primary Examiner*—Matthew Nguyen
(74) *Attorney, Agent, or Firm*—Arent Fox Kintner Plotkin & Kahn, PLLC (57) ABSTRACT

In an automatic switchover device for a power source designed to automatically switch over systems for supplying electric power to an electric load in such a manner that electric power output from an engine generator is supplied to the electric load upon power failure of a regular power source system, a seesaw-type turn member is mounted for turning movement between a first turned position in which it permits a common contact to be electrically connected to a first individual contact and a second turned position in which it permits the common contact to be electrically connected to a second individual contact. First and second solenoids capable of exerting an electromagnetic force for driving the seesaw-type turn member toward one of the first and second turned position, each include a plunger which has an operating portion enabling the plunger to be pushed in from the outside, thereby enabling an operator's manual switching.

3 Claims, 11 Drawing Sheets

AUTOMATIC SWITCHOVER DEVICE FOR POWER SOURCE

BACKGROUND OF THE INVENTION

1. Field of the Invention

The present invention relates to an automatic switchover device for a power source, designed to automatically switch over systems for supplying electric power to an electric load in such a manner that electric power output from an engine generator is supplied to the electric load upon occurrence of the power failure of a regular power source system.

2. Description of the Related Art

There is an automatic switchover device known, for example, from Japanese Patent Application Laid-open No.5-64382 and the like, which is designed so that a switch is changed over to supply electric power output from an engine generator to an electric load upon occurrence of the power failure of a regular power source system.

In such an automatic switchover device for the power source, it is necessary not only to provide an emergency automatic switchover mechanism, but also to provide a measure for enabling switching by an operator's manual operation in case of failure or the liked of a control unit. It is general that a special switching lever structure or the like is mounted on the conventional automatic switchover device.

SUMMARY OF THE INVENTION

The present invention has been achieved with the above circumstances in view, and it is an object of the present invention to provide an automatic switchover device for a power source, wherein the switching can be achieved by the operator's manual operation without provision of a special mechanism.

To achieve the above object, according to a first aspect and feature of the present invention, there is provided an automatic switchover device for a power source, comprising: a switching unit which has first and second individual contacts individually leading to a regular power source system and an engine generator, and a common contact leading to an electric load, wherein the common contact can be alternatively electrically connected to the first and second individual contacts; and a control unit for controlling the switching unit in such a manner that the common contact is electrically connected to the second individual contact in response to the regular power source system being electrically failed, and the common contact is electrically connected to the first individual contact in response to the restoration of the regular power source system, wherein the switching unit includes: a seesaw-type turn member carried on a support frame for turning movement between a first turned position in which the turn member permits the common contact to be electrically connected to the first individual contact and a second turned position in which the turn member permits the common contact to be electrically connected to the second individual contact, a spring member for exerting a spring force for retaining the turn member in one of the first and second turned positions in response to the turning movement of the turn member passing through a central point between the first and second turned positions toward one of the first and second turned positions, a first solenoid capable of exerting an electromagnetic force for driving the turn member toward the first turned position against the spring force of the spring member, and a second solenoid capable of exerting an electromagnetic force for driving the turn member toward the second turned position against the spring force of the spring member, the first and second solenoids each including a plunger which integrally comprises an operating portion enabling the plunger to be pushed in from the outside.

With such arrangement of the first feature, the supplying of the electric power from the engine generator to the electric load upon the occurrence of the power failure of the regular power source system and the supplying of the electric power from the regular power source system to the electric load upon the restoration of the regular power source system can be automatically switched over from one to the other by controlling the energization and de-energization of the first and second solenoids in a switching manner by the control unit. Moreover, in case of emergency, the electric connection between the regular power source system and the electric load and the electric connection between the engine generator and the electric load can be alternatively switched over from one to the other by pushing in the operating portions integrally provided on the plungers included in the solenoids, without utilizing the energization or de-energization of the first and second solenoids. Furthermore, it is unnecessary to mount a special lever mechanism or the like, and it is possible to achieve the switching operation by an operator's manual operation in a simple structure in which the operating portions are merely integrally provided on the plungers.

According to a second aspect and feature of the present invention, in addition to the arrangement of the first feature, the common contact is provided on a movable contact-supporting member which is operably connected to the turn member for turning movement about an axis coaxial with the turn member, and the switching unit is accommodated in a box body having an opening capable of being opened and closed by a lid member in such a manner that the operating portions are disposed on the side of the opening, and the turn member and the movable contact-supporting member are disposed on the side opposite from the opening. With such arrangement, contact portions of the first and second contacts and the common contact are disposed inside the box body, whereby the contact with the contact portions from the outside can be prevented to the utmost and moreover, the operator's manual operation can be facilitated by the disposition of the operating portions on the side of the opening.

According to a third aspect and feature of the present invention, in addition to the second feature, the common contact is provided at each of opposite ends of the movable contact-supporting member; the first and second individual contacts capable of being electrically connected to the common contact are fixedly disposed at locations corresponding to the opposite ends of the movable contact-supporting member; first and second power source terminal members individually connected to the regular power source system and the engine generator are connected to the first and second individual contacts; and a load terminal member leading to the electric load and fixedly disposed at a location corresponding to a central portion of the movable contact-supporting member is connected to the common contact. With such arrangement, the first and second power source terminal members are fixedly disposed at the opposite ends of the movable contact-supporting member, and the load terminal member is fixedly disposed in correspondence to the central portion of the movable contact-supporting member. Therefore, electric cords leading to the first and second power source terminal members and the load terminal member can be easily arranged in such a manner that a wiring line is distributed for each of the electric cords.

The above and other objects, features and advantages of the invention will become apparent from the following description of the preferred embodiment taken in conjunction with the accompanying drawings.

BRIEF DESCRIPTION OF THE DRAWINGS

FIGS. 1 to 13 show an embodiment of the present invention, wherein

DESCRIPTION OF THE PREFERRED EMBODIMENT

The present invention will now be described by way of an embodiment with reference to FIGS. 1 to 13.

Figure 1:
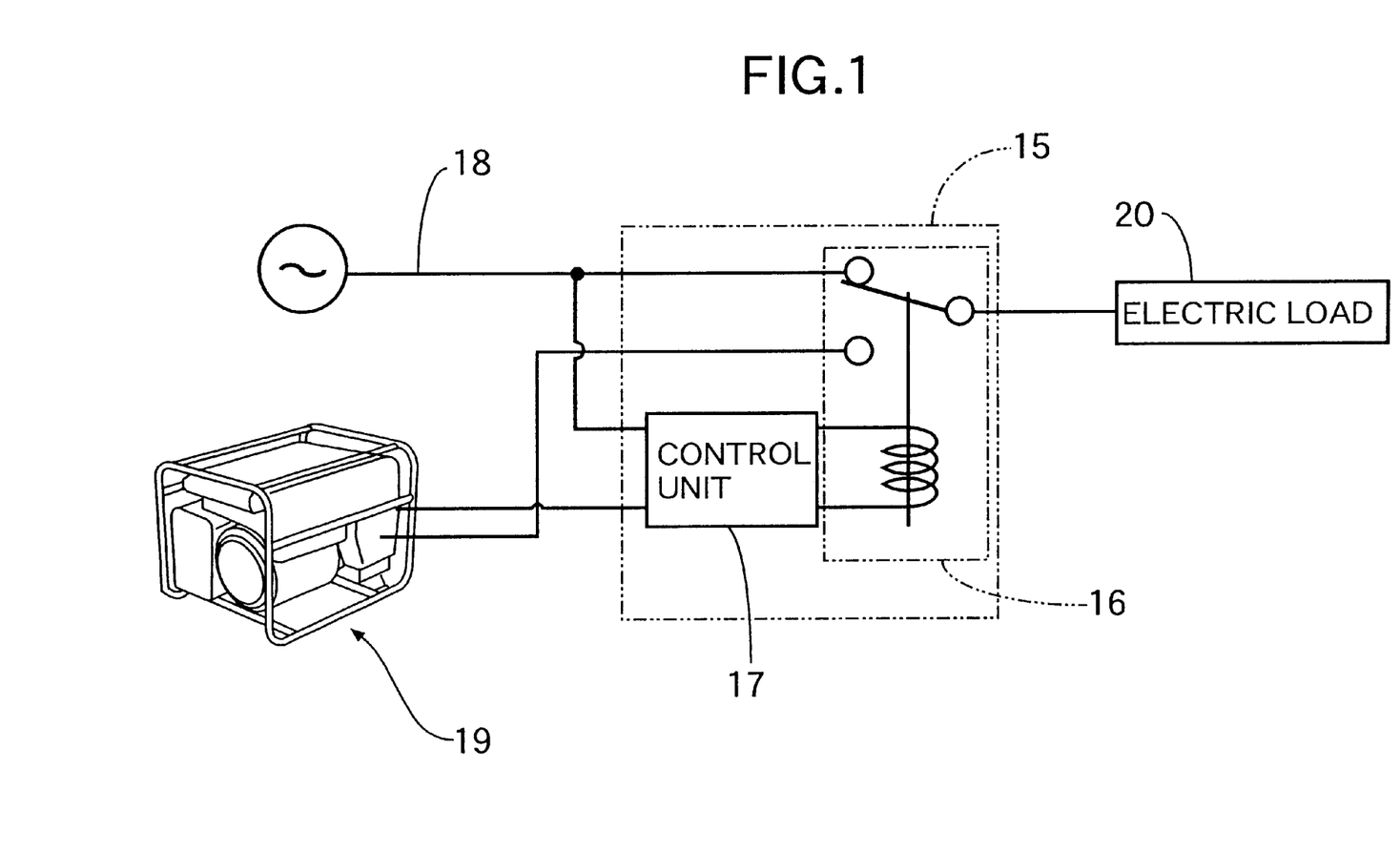
FIG. 1 is a circuit diagram showing the arrangement of an automatic switchover device.

Referring first to FIG. 1, an automatic switchover device 15 is designed to automatically switch over systems for supplying an electric power to an electric load 20 so that an electric power output by an engine generator 19 is supplied to the electric load 20 during power failure of a regular power source system 18. The automatic switchover device 15 includes a switching unit 16 operated to alternatively select the supplying of the electric power from the regular power source system 18 and the electric power output from the engine generator 19 to the electric load 20, and a control unit 17 for normally monitoring the power failure and restoration of the regular power source system 18 and controlling the operation of the switching unit 16 in response to the power failure and the restoration.

Figure 2:
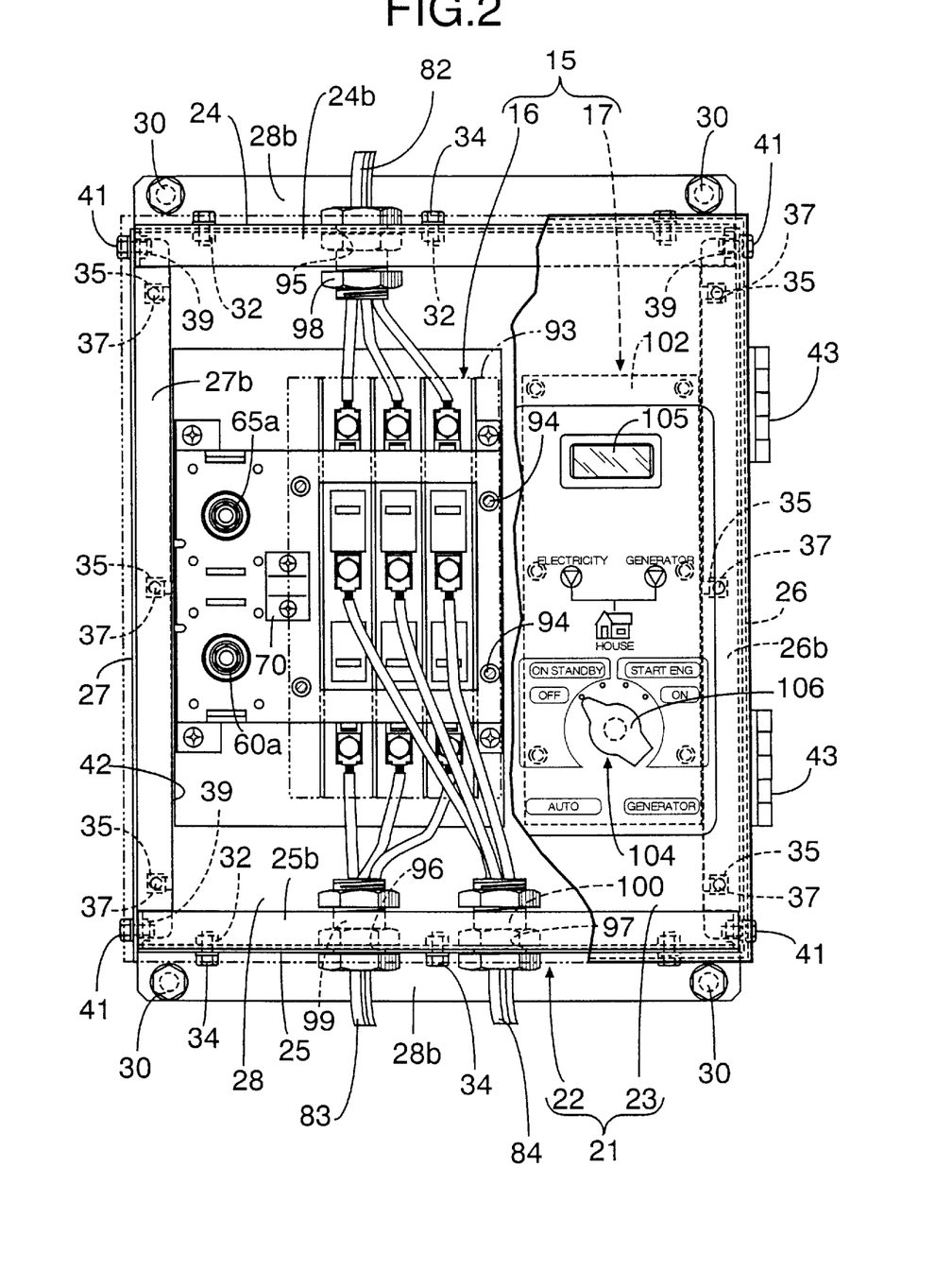
FIG. 2 is a partially cutaway front view of the automatic switchover device.
Figure 3:
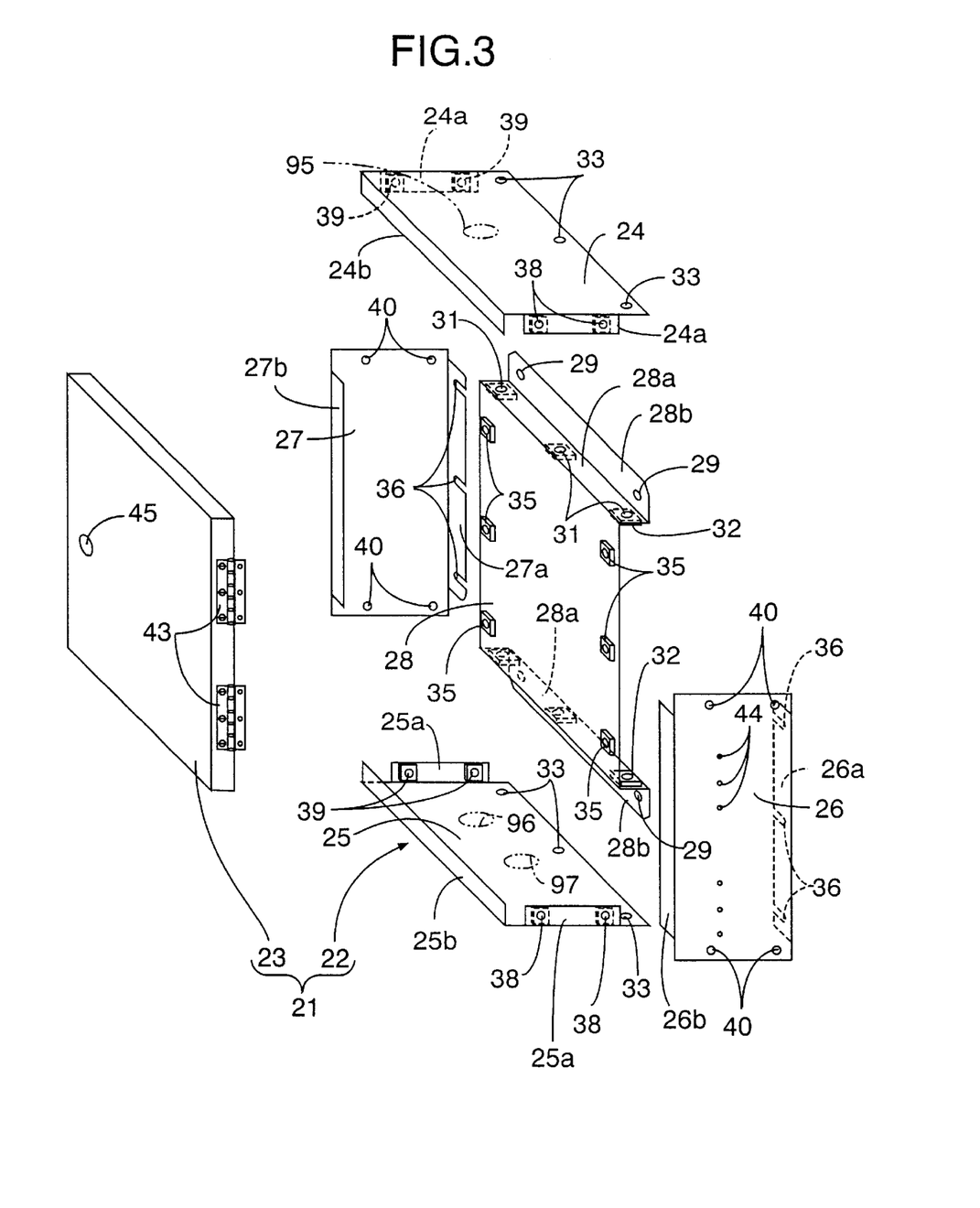
FIG. 3 is an exploded perspective view of an accommodation box.

Referring also to FIGS. 2 and 3, the automatic switchover device 15 is accommodated and fixed in an accommodation box 21 attached, for example, to a wall or the like of a house or building. The accommodation box 21 is comprised of a box body 22 formed into a bottomed quadrilateral tubular shape with its one end face closed and the other end face opened, and a lid member 23 which can open and close the opening of the box body 22. Moreover, the box body 22 comprises first, second, third and fourth side-plates 24, 25, 26 and 27 which are connected to form a quadrilateral tubular shape, and a base plate 28 which commonly and detachably connects one-end of the first, second, third and fourth side-plates 24, 25, 26 and 27 together.

The base plate 28 is formed into a quadrilateral flat plate shape. Connecting plate portions 28a, 28a are integrally connected at their base ends to two parallel sides of side edges of the base plate 28 at right angles, and mounting plate portions 28b, 28b are integrally connected at their base ends to edges of the connecting plate portions 28a, 28a at right angles, respectively. A plurality of, e.g., a pair of insertion bores 29 are provided in each of the mounting plate portions 28b, 28b so that screw members 30 (see FIG. 2) are inserted through the insertion bores 29, when the mounting plate portions 28b, 28b are secured to the wall or the like of the house or building. A plurality of, e.g., three insertion bores 31 are provided in each of the connecting plate portions 28a, 28a. Weld nuts 32 are secured to inner surfaces of the connecting plate portions 28a, 28a at locations corresponding to the insertion bores 31.

The first and second side-plates 24 and 25 opposed to each other are detachably connected to outer surfaces of the connecting plate portions 28a, 28a included in the base plate 28. Three insertion bores 33 corresponding to the insertion bores 31 in the connecting plate portions 28a, 28a are provided along one end of each of the first and second side-plates 24 and 25 adjacent to the base plate 28 so that one-ends of the first and second side-plates 24 and 25 are connected to the base plate 28 at right angles by bringing screw members 34 inserted through the insertion bores 33 and 31 into threaded engagement with the weld nuts 32 and then tightening them.

A plurality of, e.g., three insertion bores (not shown) are provided in each of the side edges of the base plate 28 on two sides perpendicular to the two sides to which the connecting plate portions 28a, 28a are connected, and weld nuts 35 individually corresponding to these insertion bores are secured to the side edges.

On the other hand, connecting plate portions 26a and 27a are connected integrally and at right angles to one ends of the third and fourth side-plates 26 and 27 adjacent to the base plate 28 at locations corresponding to the weld nuts 35, and are superposed on the base plate 28. Slits 36 are defined in the connecting plate portions 26a and 27a to open at ends of the connecting plate portions 26a and 27a so that screw members 37 threadedly engaged with the weld nuts 35 are inserted through the slits 36. Therefore, the third and fourth side-plates 26 and 27 are connected at their one ends at right angles to the base plate 28 by bringing the screw members 37 inserted through the slits 36 into threaded engagement with the weld nuts 35 and then tightening them.

Connecting plate portions 24a, 24a; 25a, 25a are connected integrally and at right angles to opposite side edges of the first and second side-plates 24 and 25 and superposed on opposite side edges of the third and fourth side-plates 26 and 27. A plurality of, e.g., a pair of insertion bores 38 are provided in each of the connecting plate portions 24a, 24a; 25a, 25a, and weld nuts 39 corresponding to the insertion bores 38 are secured to the connecting plate portions 24a, 24a; 25a, 25a. On the other hand, insertion bores 40 corresponding to the insertion bores 38 are provided in opposite side edges of the third and fourth side-plates 26 and 27, and the first, second, third and fourth side-plates 24, 25, 26 and 27 are connected together by bringing screw members 41 inserted through the insertion bores 40 into threaded engagement with the weld nuts 39 and then tightening them.

In such box body 22, the connection of the side-plates 24, 25, 26 and 27 to the base plate 28 is released by unscrewing the screw members 34 and 37, and the connection of the side-plates 24, 25, 26 and 27 to one another by unscrewing the screw members 41.

Moreover, each of the side-plates 24, 25, 26 and 27 can be removed in a direction away from the base plate 28 in a direction parallel to the pair of adjacent to side-plates upon disconnection of the side-plates 24, 25, 26 and 27 from one another and disconnection of the side-plates 24, 25, 26 and 27 from the base plate 28. When any of the side-plates 24, 25, 26 and 27 is removed, avoided is an influence to the connection of the other side-plates to one another as well as the connection of the other side-plates to the base plate. For example, to remove the first side-plate 24, the first side-plate 24 disconnected from the third and fourth side-plates 26 and 27 and disconnected from the base plate 28 can be removed upwards as viewed in FIG. 2 and at this time, there is no influence affecting the connection of the second, third and fourth side-plates 25, 26 and 27 to one another as well as the connection of the second, third and fourth side-plates 25, 26 and 27 to base plate 28.

In the present embodiment, the weld nuts 32, 35 and 39 are secured to the base plate 28 and the first and second side-plates 24 and 25, but in place of these weld nuts 32, 35 and 39, other securing-type nuts, e.g., pierced nuts or the like may be used, thereby enabling a reduction in part cost.

Collar portions 24b, 25b, 26b and 27b are connected integrally and at right angles to other ends of the side-plates 24, 25, 26 and 27 opposite from the base plate 28 to define, by cooperation with one another, a peripheral edge of an opening 42 which is provided in the other end of the box body 22 in such a manner that it is closed by a lid member 23. The lid member 23 is carried on box body 22 and hinged on the third side-plate 26 so that the box body 22 can be opened and closed, and for example, two sets of three fastening bores 44 are provided in the third side-plate 26 for fastening a pair of hinge members 43, 43 fastened to the lid member 23. A lock mechanism (not shown) for switching over the engagement and disengagement of the fourth side-plate 27 with and from the collar portion 27b is mounted to the lid member 23 on a side opposite from a side having the hinge members 43, 43, and a through-bore 45 for mounting the lock mechanism is provided in the lid member 23.

The automatic switchover device 15 is comprised of the switching unit 16 and the control unit 17, as described above. The switching unit 16 is mounted to the base plate 28 of the box body 22, while the control unit 17 is mounted to the lid member 23. Moreover, the switching unit 16 and the control unit 17 are mounted separately to the box body 22 and the lid member 23, respectively, so that they cannot be superposed on each other in a state in which the opening in the box body 22 is closed by the lid member 23, as shown in FIG. 2.

Referring also to FIGS. 4 to 7, the switching unit 16 includes a support frame 50 fastened to the base plate 28 of the box body 22 with an insulating plate 49 interposed therebetween, three first individual contacts 51 fixedly disposed on the support frame 50 and leading to the regular power source system 18, three second individual contacts 52 fixedly disposed on the support frame 50 and leading to the engine generator 19, three sets of a pair of common contacts 53 leading to the electric load 20, a seesaw-type turn member 54 carried on the support frame 50 and able to turn between a first turned position in which it permits the common contacts 53 to be electrically connected to the first individual contacts 51 and a second turned position (shown in FIG. 6) in which it permits the common contacts 53 to be electrically connected to the second individual contacts 52, a spring member 55 for exerting a spring force for retaining the turn member 54 at one of the first and second turned positions in response to the turning movement of the turn member 54 at one of the first and second turned positions, a first solenoid 56 capable of exerting an electromagnetic force for driving the turn member 54 to the first turned position against the spring force of the spring member 55, and a second solenoid 57 capable of exerting an electromagnetic force for driving the turn member 54 to the second turned position against the spring force of the spring member 55.

Figure 4:
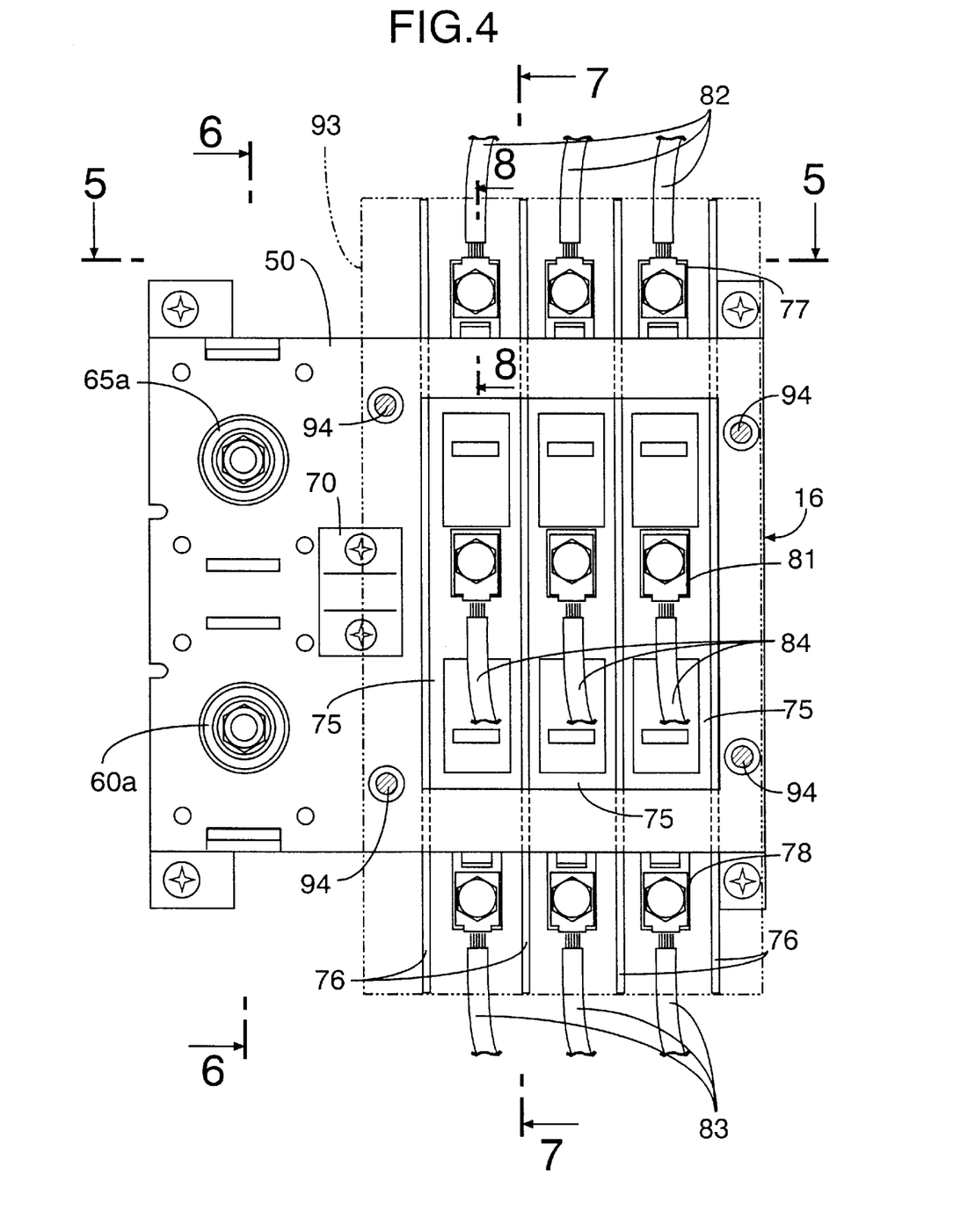
FIG. 4 is an enlarged front view of a switching unit.
Figure 5:
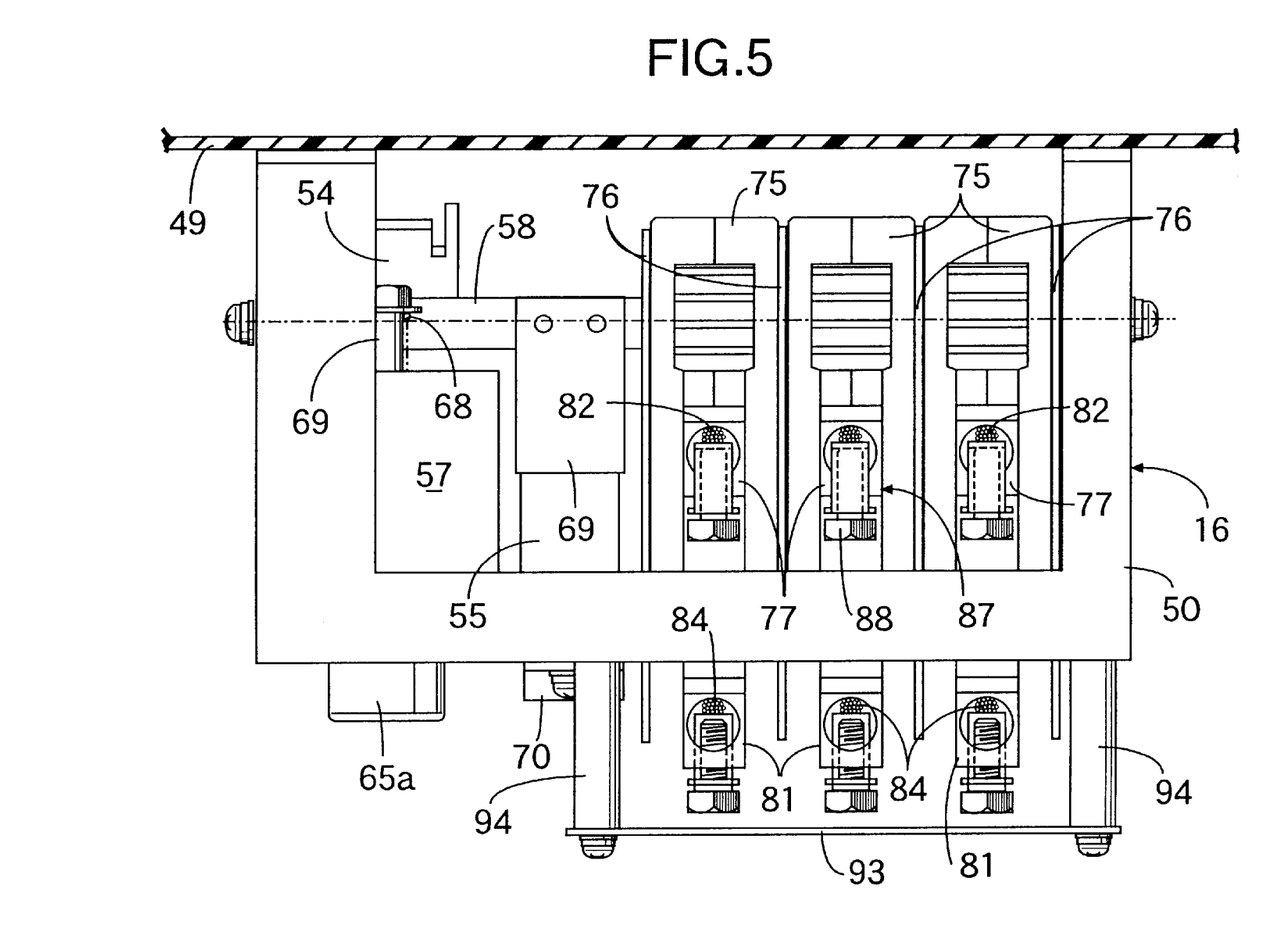
FIG. 5 is an enlarged sectional view taken along a line 5—5 in FIG. 4.

A turn shaft 58 is turnably carried at its opposite ends on the support frame 50 and disposed on a plane parallel to the base plate 28, with its major portion excluding its axially opposite ends being shaped into a rectangle in cross section. The turn member 54 extends in a direction perpendicular to an axis of the turn shaft 58, and is secured at its central portion to a portion of the turn shaft 58 closer to one end.

Figure 6:
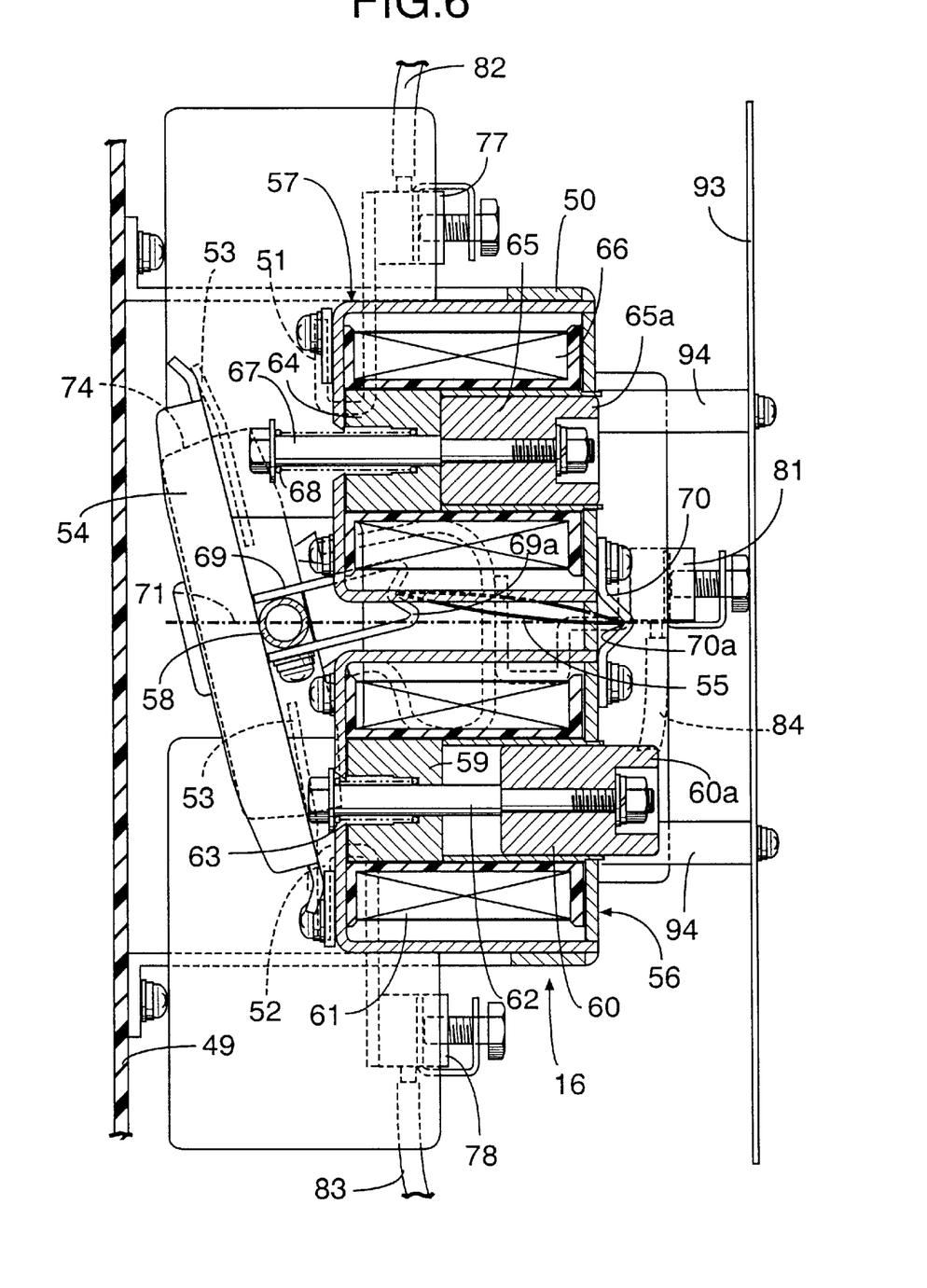
FIG. 6 is a sectional view taken along a line 6—6 in FIG. 4.

Referring particularly carefully to FIG. 6, the first solenoid 56 is disposed on the support frame 50 in correspondence to one end (a lower end as viewed in FIG. 6) of the turn member 54, and the second solenoid 57 is disposed on the support frame 50 in correspondence to the other end (an upper end as viewed in FIG. 6) of the turn member 54.

The first solenoid 56 disposed on the support frame 50 includes a stationary core 59 adjacent to the turn member 54, a plunger 60 opposed to the stationary core 59 on a side opposite from the turn member 54, a coil 61 which exerts an electromagnetic force for attracting the plunger 60 to the stationary core 59, an urging rod 62 connected to the plunger 60 and passing through a central portion of the stationary core 59 for axial movement in such a manner that one end thereof can be put into abutment against one end of the turn member 54, and a return spring 63 mounted between the urging rod 62 and the stationary core 59 while exerting a spring force for moving the plunger 60 away from the stationary core 59.

The second solenoid 57 disposed on the support frame 50 includes a stationary core 64 adjacent to the turn member 54, a plunger 65 opposed to the stationary core 64 on a side opposite from the turn member 54, a coil 66 which exerts an electromagnetic force for attracting the plunger 65 to the stationary core 64, an urging rod 67 connected to the plunger 65 and passing through a central portion of the stationary core 64 for axial movement in such a manner that one end thereof can be put into abutment against one end of the turn member 54, and a return spring 68 mounted between the urging rod 67 and the stationary core 64 while exerting a spring force for moving the plunger 65 away from the stationary core 64.

A spring-receiving arm 69 forming a substantially T-shape together with the turn member 54 is secured at its base end to the turn shaft 58 at right angles at a location adjacent to a portion to which the turn member 54 is fixed, and a spring-receiving member 70 is fastened to the support frame 50 at a location corresponding to a portion between the first and second solenoids 56 and 57.

Receiving portions 69a and 70a recessed in a triangular shape are formed at a tip end of the spring-receiving arm 69 and the spring-receiving member 70 in such a manner that they are opposed to each other, and the spring member 55 which is a leaf spring is received at its opposite ends on the receiving portions 69a and 70a. Moreover, the spring-receiving member 70 is mounted so that, when the turn member 54 is at a location halfway between the first and second turned positions, a straight line 71 interconnecting a central portion of the receiving portion 70a of the spring-receiving member 70, i.e., an abutment point at one end of the spring member 55 and an axis of the turn shaft 58 is perpendicular to the turn member 54. When the turn member 54 is at the location halfway between the first and second turned positions, a central portion 69a of the spring-receiving arm 69, i.e., an abutment point at the other end of the spring member 55 lies on the straight line 71.

Therefore, when the central portion of the receiving portion 69a of the spring-receiving arm 69 passes the straight line 71 in the turning movement of the turn member 54 from the second turned position shown in FIG. 6 toward the first turned position, the spring member 55 exerts the spring force for urging the turn member 54 toward the first turned position. On the other hand, when the central portion 69a of the spring-receiving arm 69 passes the straight line 51 in the turning movement of the turn member 54 from the first turned position toward the second turned position, the spring member 55 exerts the spring force for urging the turn member 54 toward the second turned position.

When the coil 61 is in a non-energized state, the first solenoid 56 is in a state in which one end of the urging rod 62 is in abutment against one end of the turn member 54 lying in the second turned position. When the coil 61 is energized in a non-energized state of the coil 66 in the second solenoid 57, the urging rod 62 urges the turn member 54 toward the first turned position, until the central portion of the receiving portion 69a of the spring-receiving arm 69 passes the straight line 71. When the turn member 54 is thereafter turned to the first turned position under the action of the spring force of the spring member 55, the one end of the turn member 54 is moved away from the one end of the urging rod 62. On the other hand, when the coil 66 is in the non-energized state, the second solenoid 57 is in a state in which one end of the urging rod 67 is in abutment against the other end of the turn member 54 lying in the first turned position. When the coil 66 is energized in the non-energized state of the coil 61 of the first solenoid 56, the urging rod 67 urges the turn member 54 toward the second turned position, until the central portion of the receiving portion 69a of the spring-receiving arm 69 passes the straight line 71. When the turn member 54 is thereafter turned to the second turned position under the action of the spring force of the spring member 55, the other end of the turn member 54 is moved away from the one end of the urging rod 67.

Moreover, the position of the turn member 54 lying in the first turned position is maintained under the action of the spring force of the spring member 55, and a spring load of the return spring 68 applied to the urging rod 62 in contact with the turn member 54 lying in the first turned position is set lower than the spring force of the spring member 55. The position of the turn member 54 lying in the second turned position is maintained under the action of the spring force of the spring member 55, a spring load of the return spring 63 applied to the urging rod 62 in contact with the turn member 54 lying in the second turned position is set lower than the spring force of the spring member 55.

A turning force can be applied to the turn member 54 by a manual operation with the coils 61 and 66 of the first and second solenoids 56 and 57 remaining non-energized, and the plungers 60 and 65 provided in the first and second solenoids 56 and 57 are integrally provided with operating portions 60a and 65a each capable of applying a manually operating force, respectively. The operating portions 60a and 65a are integrally provided at outer ends of the plungers 60 and 65 in such a manner that the plungers 60 and 65 are pushed into the first and second solenoids 56 and 57 from the outside, whereby the operating force is exerted to the turn member 54 by the urging rods 62 and 67. The operating portions 60a and 65a are formed to protrude from the support frame 50, when the coils 61 and 66 of the first and second solenoids 56 and 57 are in their non-energized states.

For example, three movable contact-supporting members 74 each made of an insulating material are secured being spaced apart from one another to the turn shafts 58 on a side opposite from the turn member 54 with respect to the spring-receiving member 70. In other words, the movable contact-supporting members 74 are operably connected to the turn member 54 for turning movement about an axis coaxial with the turn member 54.

Fixed to the support frame 50 are support blocks 75 each made of an insulating material and corresponding to the movable contact-supporting members 74, and a plurality of, e.g., four partition plates 76 for separating the movable contact-supporting members 74 and the support blocks 75.

Common contacts 53, 53 are provided at opposite ends of each of the movable contact-supporting members 74 to partially protrude from each of the movable contact-supporting members 74. The first and second individual contacts 51 and 52 are fixed to each of the support blocks 75 at locations corresponding to the opposite ends of each of the movable contact-supporting members 74. More specifically, the first individual contact 51 is fixed to the support block 75 in such a manner that it is brought into conductive contact with one (upper one as viewed in FIG. 7) of the common contacts 53 in response to the turning movement of the movable contact-supporting members 74 to the first turned position along with the turn member 54, and the second individual contact 52 is fixed to the support blocks 75 in such a manner that it is brought into conductive contact with the other (lower one as viewed in FIG. 7) of the common contacts 53 in response to the turning movement of the movable contact-supporting members 74 to the second turned position along with the turn member 54.

Figure 7:
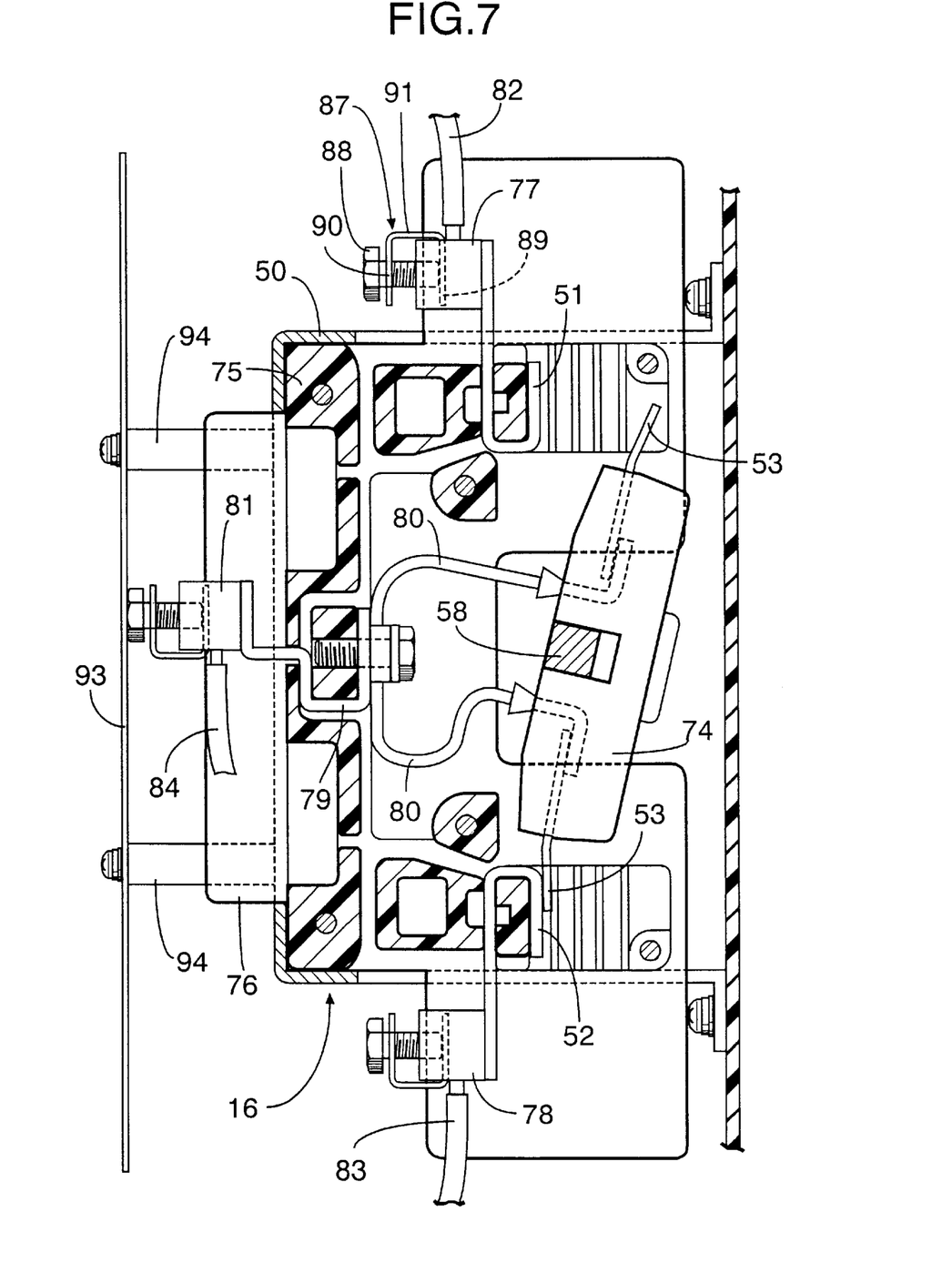
FIG. 7 is a sectional view taken along a line 7—7 in FIG. 4.

First power source terminal members 77 are connected to the first individual contacts 51, respectively, and second power source terminal members 78 are connected to the second individual contacts 52, respectively. Conductive members 80 are fixedly disposed on the support blocks 75 at locations corresponding to central portions of the movable contact-supporting members 74 and connected to the common contacts 53 through lead wires 79, and load terminal members 81 are integrally connected to the conductive members 80 and each leading to each pair of common contacts 53 through the conductive members 80 and the lead wires 79.

Electric cords 82 leading to the regular power source system 18 are connected to the first power source terminal members 77; electric cords 83 leading to the engine generator 19 are connected to the second power source terminal members 78; and electric cords 84 leading to the electric load 20 are connected to the load terminal members 81.

Figure 8:
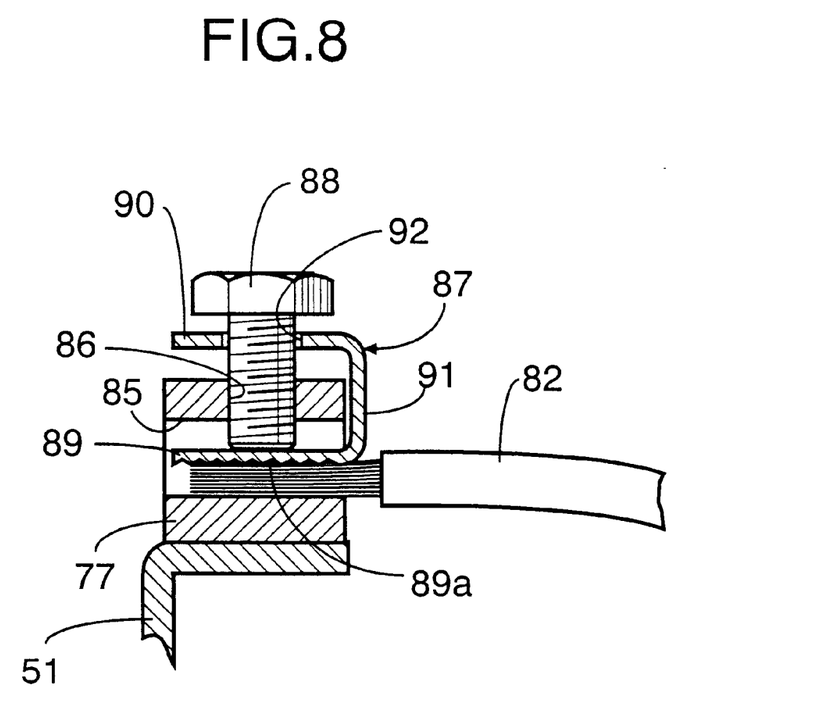
FIG. 8 is an enlarged sectional view of a structure of connection of an electric cord to a terminal member, taken along a line 8—8 in FIG. 4.
Figure 9:
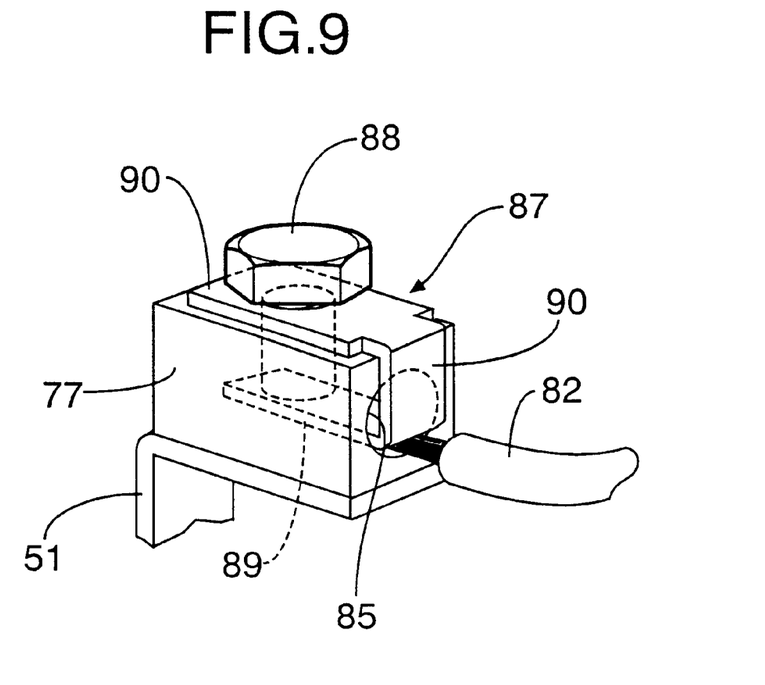
FIG. 9 is a perspective view showing the structure of connection of the electric cord to the terminal member.
Figure 10:
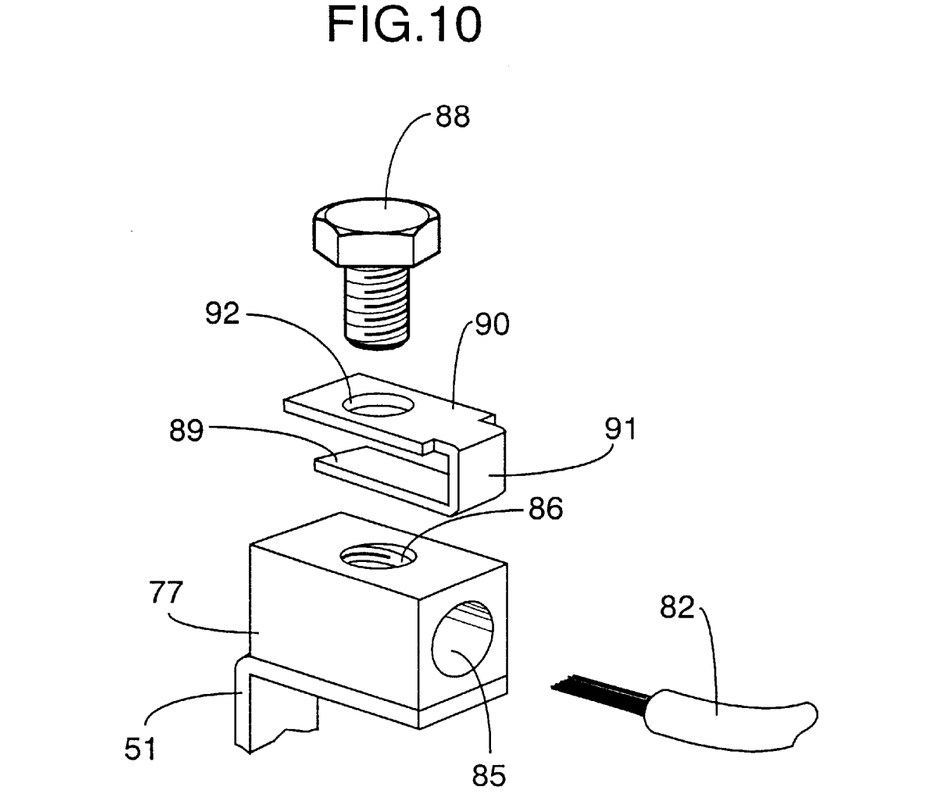
FIG. 10 is an exploded perspective view showing the structure of connection of the electric cord to the terminal member.

Referring to FIGS. 8 to 10, each of the first terminal members 77 is made of a conductive material and has an insertion bore 85 into which the electric cord 82 is inserted, and a threaded bore 86 having an axis perpendicular to the insertion bore 85. To connect the electric cord 82 to the first terminal member 77, a retainer 87 made of a conductive material is mounted on the first terminal member 77, and a bolt 88 is screwed into the first terminal member 77.

The retainer 87 comprises a clamping plate 89 inserted into the insertion bore 86 for clamping the electric cord 82 between the clamping plate 89 and an inner surface of the insertion bore 85, a plate 90 opposed to an outer surface of the first terminal member 77 and having an insertion bore 92 through which the bolt 88 is inserted, and a connecting plate 91 connecting one ends of the clamping plate 89 and the opposed plate 90. The clamping plate 89, the opposed plate 90 and the connecting plate 91 are integrally connected to one another to form a substantially U-shape in cross section. The bolt 88 inserted through the insertion bore 92 is screwed into the threaded bore 86 in such a manner that its tip end can be put into abutment against the clamping plate 89, and a insulation-removed portion at one end of the electric cord 82 inserted in the insertion bore 85 is clamped between the clamping plate 89 and an inner surface of the insertion bore 85 by tightening the bolt 88, whereby the electric connection of the electric cord 82 to the first terminal member 77 is achieved.

The insertion bore 85 is provided in the first terminal member 77 with its opposite ends opened so that the electric cord 82 can be inserted into the insertion bore 85 from any of axial directions, and the retainer 87 is formed into the substantially U-shape so that the clamping plate 89 can be inserted into the insertion bore 85 from any of axial directions, and the tip end of the bolt 88 can be put into abutment against the inserted clamping plate 89.

Moreover, as best shown in FIG. 8, a rugged portion 89a is formed on a surface of the clamping plate 89 on the side of the electric cord 82. Thus, the clamping plate 89 can be forced to bite into the insulation-removed portion of the electric cord 82, thereby reliably retaining the electric contact state of the electric cord 82 with the first terminal member 77.

Figure 11:
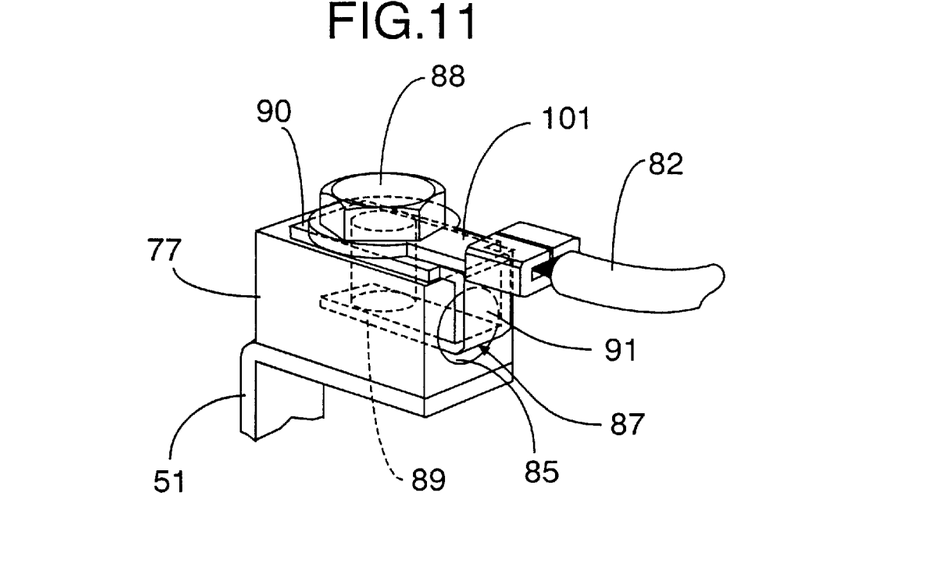
FIG. 11 is a perspective view similar to FIG. 9, but showing an eyelet-type terminal mounted at one end of the electric cord.

In some cases, an eyelet-type terminal 101 shown in FIG. 11 may be mounted at one end of the electric cord 82. However, the threaded engagement of the first terminal member 77 in the threaded bore 88 can be released to withdraw the bolt 88 from the opposed plate 90 of the retainer 87 and hence, the eyelet-type terminal 101 inserted between the opposed plate 90 and the outer surface of the first terminal member 77 can be clamped between the opposed plate 90 and the outer surface of the first terminal member 77 by tightening the bolt 88, and the eyelet-type terminal 101 can be electrically connected to the first power source terminal member 77.

The structure of connection of the electric cord 83 to the second power source connecting terminal 78 as well as the structure of connection of the electric cord 84 to the load connecting terminal 81 are basically the same as the structure of connection of the electric cord 82 to the first power source connecting terminal 77 and hence, the detailed description of them is omitted.

This switching unit 16 is accommodated within the box body 22 having the opening 42 capable of being opened and closed by the lid member 23 so that the operating portions 60a and 65a of the first and second solenoids 56 and 57 are disposed on the side of the opening 42, and the turn member 54 and the movable contact-supporting members 74 are disposed on the side opposite from the opening 42, i.e., on the side of the base plate 28.

Moreover, portions of the electric cords 82, 83 and 84 connected to the terminal members 77, 78 and 81 are covered with a cover plate 93 which is detachably mounted at tip ends of a plurality of support posts 94 embedded in the support frame 50.

Electric cords 82, 83 and 84 are led out of the accommodation box 21 accommodating the switching unit 16. In the present invention, the first side-plate 24 of the box body 22 is provided with electric cord-leading bore 95 for leading out the electric cords 82 connecting the first power source terminal members 77 and the regular power source system 18 to each other, and the second side-plate 25 is provided with an electric cord-leading bore 96 for leading out the electric cords 83 connecting the second power source terminal members 78 and the engine generator 19 to each other, and with an electric cord-leading bore 97 for leading out the electric cords 84 connecting the load terminal members 81 and the electric load 20 to each other. Moreover, lead-out pipes 98, 99 and 100 are secured to the first and second side-plates 24 and 25 to extend through the electric cord-leading bores 95, 96 and 97, and the electric cords 82, 83 and 84 are led out of the box body 22 through the lead-out pipes 98, 99 and 100.

Figure 12:
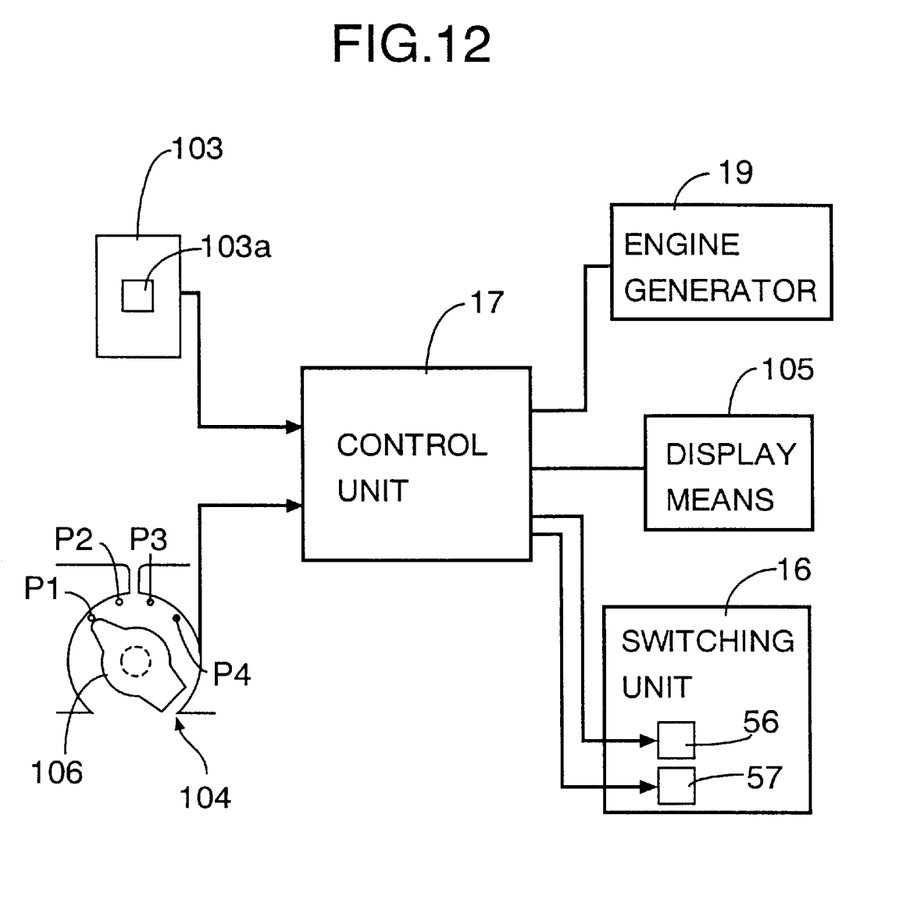
FIG. 12 is a block diagram showing the arrangement of a control system.

Referring also to FIG. 12, the control unit 17 comprises microchips or the like mounted on a substrate 102 fixedly disposed on an inner surface of the lid member 23 of the accommodation box 21. The control unit 17 receives a set-time change indicating signal from a set-time changing means 103 disposed on the substrate 102, as well as a signal based on the operation of a control-mode establishing means 104 disposed on the outer surface of the lid member 23. The control unit 17 has a function to regularly monitor the power failure and restoration of the regular power source system 18. On the basis of a result of such detection and the signals from the set-time changing means 103 and the control-mode establishing means 104, the control unit 17 controls the energization and de-energization of the first and second solenoids 56 and 57, the starting and stoppage of the engine generator 19, and the display on a display means 105 provided on the lid member 23 and formed of a liquid crystal or the like.

The set-time changing means 103 is constituted to be able to set the time required for warming the engine generator 19 at three periods, e.g., 15, 30 and 120 seconds depending on the operation of an operating portion 103a of the set-time changing means 103, and a time set by the set-time changing means 103 is input into the control unit 17 from the set-time changing means 103.

The control-mode establishing means 104 has an operating dial 106 capable of being turned and, according to the turning movement of the operating dial 106 from first to fourth positions P1, P2, P3 and P4, different signals made at the positions P1, P2, P3 and P4 for establishing control modes by the control unit 17 are input into the control unit 17 from the control-mode establishing means 104.

The first position P1 is a position for stopping the control operation by the control unit 17, and the second position P2 is a position for an automatic switchover control mode of a power supply system. When the operating dial 106 is turned to the second position P2, the switching control of the switching unit 16, the controlling of the starting and stoppage of the engine generator 19 and the controlling of the displaying on the display means 105 are automatically carried out by the control unit 17. The third position P3 is a position for manually starting the engine generator 19, and when the operating dial 106 is turned to the third position P3, the control unit 17 starts the engine generator 19. Further, the fourth position P4 is a position for supplying electric power output from the engine generator 19 to the electric load 20, and when the operating dial 106 is turned to the fourth position P4, the control unit 17 controls the operation of the switching unit 16 to supply the electric power output from the engine generator 19 to the electric load 20, irrespective of whether the power failure of the regular power source system 18 has occurred or not.

Figure 13:
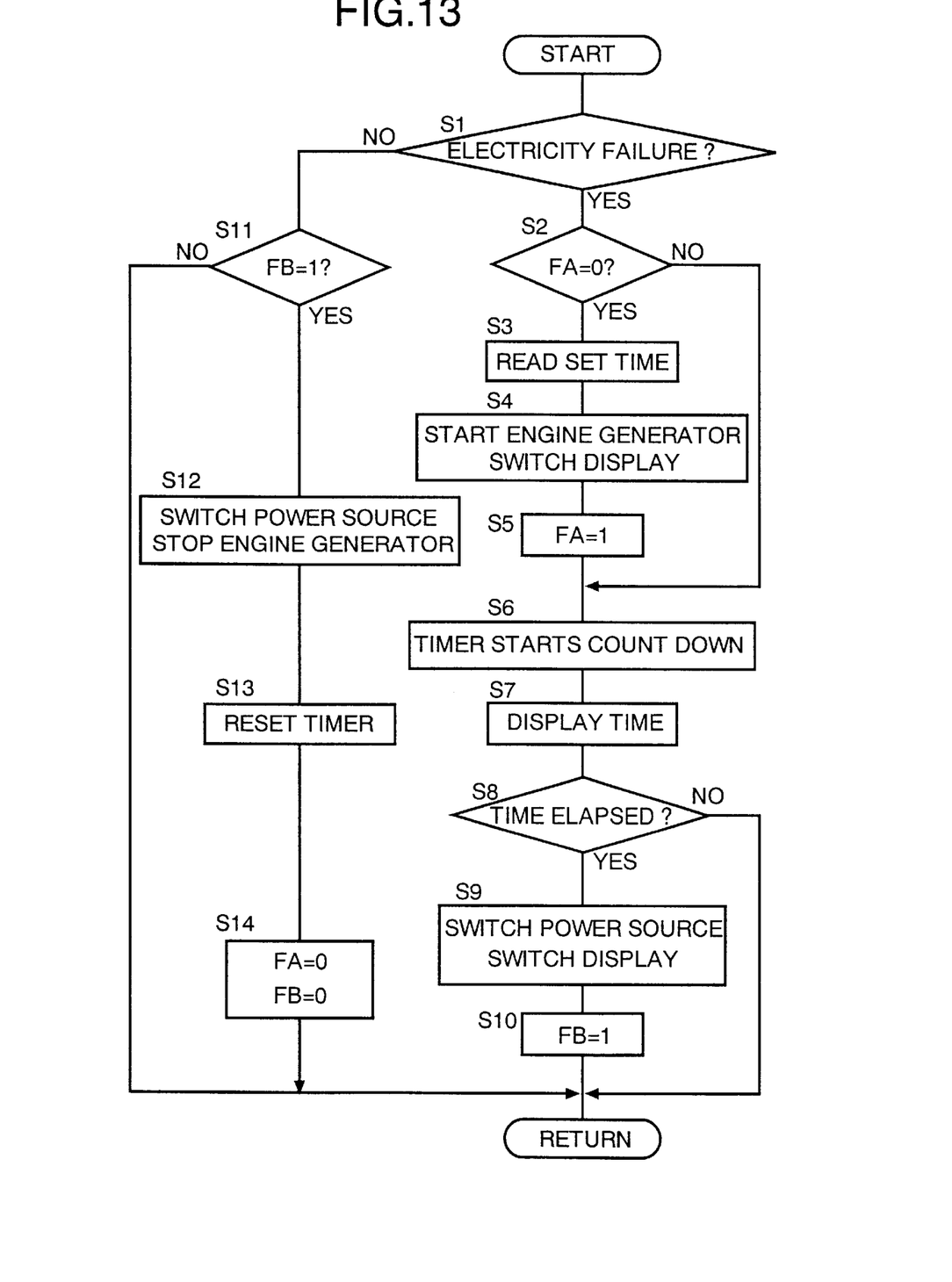
FIG. 13 is a flow chart showing a controlling procedure in an automatic switchover mode.

In the automatic switchover control mode, the control unit 17 controls the energization and de-energization of the first and second solenoids 56 and 57 in the switching unit 16, the starting and stoppage of the engine generator 19 and the display on the display means 105 according to a procedure shown in FIG. 13. At Step S1, it is determined whether the power failure has occurred in the regular power source system 18. In the case of power failure, it is checked at Step S2 whether a flag FA is "0". The flag FA is a flag indicative of whether the engine generator 19 is in operation. When the engine generator 19 is in operation, the FA=1.

When FA=0 has been confirmed at Step S2, i.e., when the engine generator 19 is in a non-operated state, a time set by the set-time changing means 103 is read at Step S3, and the engine generator 19 is started and at the same time, the display state of the display means 15 is switched at Step S4.

The control unit 17 is capable of controlling the display on the display means 105 by switching over, from one to the other, a state in which the cumulative operation time of the engine generator 19 is displayed, and a state in which the decreasing of the time set by the set-time changing means 103 after the starting of the engine generator 19 is displayed in a counting-down manner during warming operation of the engine generator 19, until the set time is elapsed. At Step S4, the control unit 17 switches the display means 105 into the state in which the decreasing of the set time is displayed in the counting-down manner during the warming operation of the engine generator 19.

At Step S5, the flag FA is set at "1" in response to the starting of the engine generator 19 at Step S4, progressing to Step S6. When FA=1 has been determined at Step S2, the procedure advances to Step S6, detouring Steps S3, S4 and S5.

At Step S6, a timer for counting the time set by the set-time changing means 103 performs the counting-down, and at Step S7, the decreasing of the set time is displayed in the counting-down manner on the display means 105.

At next Step S8, it is determined whether the time set by the set-time changing means 103 has been elapsed. When the time set by the set-time changing means 103 has been elapsed, i.e., when it is determined that the warming operation of the engine generator 19 for the set time has been completed, the switching unit 16 is controlled at Step S9 so that electric power to be supplied to the electric load 20 is changed from the electric power of the regular power source system 18 to the electric power output of the engine generator 19, and the display means 105 is switched to the state in which the cumulative operation time for the engine generator 19 is displayed.

At Step S10, a flag FB is set at "1". The flag FB is a flag indicative of which of the electric power from the regular power source system 18 and the electric power output from the engine generator 19 is being supplied to the electric load 20. In a state in which the electric power output from the engine generator 19 is being supplied to the electric load 20, FB=1, and at Step S10, the FB=1 is established in response to the switching-over of the power source.

When it is determined at Step S1 that the power failure is not generated, i.e., in a state in which the electric power from the regular power source system 18 is being used and the power failure of the regular power source system 18 is not generated, or in a state in which the electric power output from the engine generator 19 is being used and the regular power source system 18 has been restored to the normal state, the procedure advances from Step S1 to Step S11, and at Step S11, it is determined whether the flag FB is "1".

When FB=1 has been determined at Step S11, i.e., when it is determined that the regular power source system 18 has been restored in the normal state in the state in which the electric power output from the engine generator 19 is being used, the switching unit 16 is controlled at Step S12 so that the electric power to be supplied to the electric load 20 is switched from the electric power output of the engine generator 19 to the electric power of the regular power source system 18, and the engine generator 19 is stopped. Thereafter, at Step S13, the timer for counting down the set time is reset, and at Step S14, the flags FA and FB are set at "0".

The operation of the present embodiment will be described below. The switching unit 17 controlled by the control unit 17 includes the seesaw-type turn member 54 carried on the support frame 50 for turning movement between the first turned position in which it permits the common contacts 53 leading to the electric load 20 to be electrically connected to the first individual contacts 51 leading to the regular power source system 18 and a second turned position in which it permits the common contacts 53 to be electrically connected to the second individual contacts 52 leading to the engine generator 19, the spring member 55 for exerting the spring force for retaining the turn member 54 at one of the first and second turned positions in response to the turning movement of the turn member 54 to one of the first and second turned positions, the first solenoid 56 capable of exerting the electromagnetic force for driving the turn member 54 to the first turned position against the spring force of the spring member 55, and the second solenoid 57 capable of exerting the electromagnetic force for driving the turn member 54 to the second turned position against the spring force of the spring member 55.

With the switching unit 16, the supplying of the electric power from the engine generator 19 to the electric load 20 upon the occurrence of the power failure of the regular power source system 18 and the supplying of the electric power from the regular power source system 18 to the electric load 20 upon the restoration of the regular power source system 18 can be switched over automatically from one to the other by controlling the energization and de-energization of the first and second solenoids 56 and 57 in the switching-over manner by the control unit 17.

The plungers 60 and 65 of the first and second solenoids 56 and 57 are integrally provided with the operating portions 60a and 65a which can be operated from the outside to push the plungers 60 and 65. For example, when the control unit 17 breaks down, the connection of the regular power source system with the electric load 20 and the connection of the engine generator 19 with the electric load 20 can be alternatively switched over by an operator from one to the other by pushing the operating portions 60a and 65a, irrespective of the energization and de-energization of the first and second solenoids 56 and 57. Moreover, it is unnecessary to mount a special lever mechanism, and the switching operation can be achieved by the operator's manual operation using a simple structure in which the operating portions 60a and 65a are merely integrally provided on the plungers 60 and 65.

The common contacts 53 are mounted on the movable contact-supporting member 74 operably connected to the turn member 54 for turning movement about the axis coaxially with the turn member 54, and the switching unit 16 is accommodated in the box body 22 having the opening 42 capable of being opened and closed by the lid member 23 in such a manner that the operating portions 60a and 65a are disposed on the side of the opening 42, and the turn member 54 and the movable contact supporting member 64 are disposed on the side opposite from the opening 42. Therefore, the connections between the first and second individual contacts 51 and 52 and the common contacts 53 are disposed inside the box body 22, whereby the contact with the connections from the outside is prevented to the utmost, and moreover, the manual operation of the operating portions 60a and 65a can be easily achieved by the operator, because the operating portions 60a and 65a are disposed on the side of the opening 42.

Further, the common contacts 53 are mounted at the opposite ends of the movable contact-supporting member 74, and the first and second individual contacts 51 and 52 capable of being electrically connected to the common contacts 53 are fixedly disposed at the locations corresponding to the opposite ends of the movable contact-supporting member 74. The first and second terminal members 77 and 78 individually leading to the regular power source system 18 and the engine generator 19 are connected to the first and second individual contacts 51 and 52, and the terminal members 81 connected to the electric load 20 and fixedly disposed at the locations corresponding to the central portion of the movable contact-supporting member 74 are connected to the common contacts 53. With such arrangement, the electric cords 82, 83 and 84 leading to the first and second power source terminal members 77 and 78 and the load terminal members 81 can be easily arranged in such a manner that a wiring line is distributed for each of the electric cords 82, 83 and 84.

To connect the electric cords 82, 83 and 84 to the terminal members 77, 78 and 81, the terminal members 77, 78 and 81 are provided with the insertion bores 85 for insertion of the electric cords 82, 83 and 84 and with the threaded bores 86 having the axis perpendicular to the insertion bores 85, respectively. The retainer 87 made of a conductive material is comprised of the following plates integrally connected to one another to form the substantially U-shape in cross section: the clamping plate 89 inserted into the insertion bore 85 for clamping each of the electric cords 82, 83 and 84 between the clamping plate 89 and the inner surface of the insertion bore 85, the plate 90 opposed to the outer surface of each of the terminal members 77, 78 and 81 and having the insertion bore 92, and the connecting plate 91 connecting the one ends of the clamping plate 89 and the opposed plate 90. The tip end of the bolt 88 inserted through the insertion bore 92 and threadedly screwed in the threaded bore 86 is in abutment against the clamping plate 89.

Therefore, the turning movement of the clamping plate 89 about the axis of the threaded bore 86 is inhibited only by inserting the clamping plate 89 into the insertion bore 85, and each of the electric cords 82, 83 and 84 can be clamped at one end thereof between the clamping plate 89 and the inner surface of the insertion bore 85 in the simple structure in which the tip end of the bolt 88 is put into abutment against the clamping plate 89, while preventing the occurrence of the twisting of the electric cords 82, 83 and 84 and the damaging of their strands. Thus, it is possible to reliably maintain the electric connection of the electric cords 82, 83 and 84 to the terminal members 77, 78 and 81.

Moreover, it is possible to release the threaded engagement of the bolt 88 in the threaded bore 86 to withdraw the bolt 88 from the opposed plate 90. Therefore, the eyelet-type terminal 101 inserted between the opposed plate 90 and the outer surface of each of the terminal members 77, 78 and 81 can be clamped between the opposed plate 90 and the outer surface of each of the terminal members 77, 78 and 81 by tightening the bolt 88, and can be electrically connected to each of the terminal members 77, 78 and 81.

The insertion bore 85 is provided in each of the terminal members 77, 78 and 81 with its opposite ends opened, and the tip end of the bolt 88 can be put into abutment against the clamping plate 89 capable of being inserted into the insertion bore 85 from any of axial directions. Therefore, the electric cords 82, 83 and 84 can be electrically connected to the terminal members 77, 78 and 81 from any of the axial directions in selecting the direction of insertion of the clamping plate 89 and each of the electric cords 82, 83 and 84 into the insertion bore 86.

The accommodation box 21 for accommodation of the automatic switchover device 15 is comprised of the box body 22 formed into the bottomed quadrilateral tubular shape with one end closed and the other end opened, and the lid member 23 which can open and close the opening 42 in the box body 22. The box body 22 comprises the four first, second, third and fourth side-plates 24, 25, 26 and 27 forming the quadrilateral tubular shape upon the connection of them, and the base plate 28 which commonly and detachably connects one ends of the side-plates 24, 25, 26 and 27. A plate to be bored or the like is not required as in the prior art and hence, the box body 22 can be formed by a reduced number of special parts and at a reduced number of assembling steps.

Moreover, each of the side-plates 24, 25, 26 and 27 is detachably connected to the other adjacent to side-plates 24, 25, 26, 27 so that when one or more of the side plates 24, 25, 26 and 27 selected to be provided with the electric cord leading-out bore 95, 96, 97, e.g., the side-plates 24 and 25, are removed for boring, it is possible to avoid that such removal affects the connection of the other side-plates to one another as well as the connection of the other side-plates to the base plate 28.

Therefore, depending on the situation of a place for setting the accommodation box 21, only the side-plate selected to be provided with the electric cord leading-out bores 95, 96, 97 for leading-out the electric cords 82, 83, 84 leading to the automatic switchover device 15 can be removed without affecting the other parts of the box body 22, and then subjected to a boring treatment for providing the electric cord leading-out bores 95, 96, 97. Depending on the situation of a place for setting the accommodation box 21, positions of the electric cord leading-out bore 95, 96, 97 can be determined as desired.

The side-plates 24, 25, 26 and 27 and the base plate 28 are disconnectably connected to one another and hence, if the box body 22 is disassembled into the four side-plates 24, 25, 26 and 27 and the base plate 28 when the accommodation box 21 is transported, a space required for such transportation can be reduced, leading to an enhanced transporting efficiency.

Further, the switching unit 16 and the control unit 17 constituting the automatic switchover device 15 are mounted separately to the box body 22 and the lid member 23 in such an arrangement that the superposition of the switching unit 16 and the control unit 17 is avoided in a state in which the opening 42 in the box body 22 is closed by the lid member 23. Thus, it is easy to ensure a space required for wiring of the automatic switchover device 15 within the accommodation box 21. In addition, it is possible to enhance the packaging density in the accommodation box 21 and to increase the degree of freedom of determination of the positions for provision of the electric cord leading-out bores 95, 96 and 97.

The lid member 23 of the accommodation box 21 is provided with the display means 105, the displaying state of which is controlled by the control unit 17. The control unit 17 is configured to control the switching operation of the switching unit 16 to supply the electric power output from the engine generator 19 to the electric load 20 upon completion of the warming operation after lapse of the set time from the starting of the engine generator 19 in response to the occurrence of the power failure of the regular power source system 18, and to control the display means 105 to display the set time upon starting of the engine generator 19.

Therefore, when the engine generator 19 is started as a result of the power failure of the regular power source system 18, the time required for the warming of the engine generator 19 is displayed on the display means 105. Even if there is a delay until the electric power is supplied to the electric load 20 after the starting of the engine generator 19, it is possible to allow a user to recognize that the engine generator 19 is being warmed and hence, it is possible to eliminate a possibility that the user has a feeling of mistrust that the automatic switchover device 15 has broken down.

Moreover, the set time can be changed by the set-time changing means 103 and hence, the warming time for the engine generator 19 can be determined at an appropriate value depending on the situation of operation of the engine generator 19, and to appropriately display the warming time in accordance with the change in set time.

The control unit 17 controls the display means 105 to display the decreasing of the set time in a counting-down manner with the lapse of time after the starting of the engine generator 19. Thus, it is possible for the user to appropriately grasp the time taken until the electric power is supplied to the electric load 20, thereby providing a sense of relief.

Further, the control unit 17 controls the display means 105 to display the cumulative operational time of the engine generator 19 in the case other than during the warming operation of the engine generator 19. Therefore, it is possible to easily construct a system designed to enable the operator to appropriately grasp the timing for carrying out the maintenance of the engine generator 19, and moreover, designed to provide an emergent displaying upon the occurrence of the power failure of the regular power source system 18 so that the user does not have a feeling of mistrust.

Although the embodiment of the present invention has been described in detail, it will be understood that the present invention is not limited to the above-described embodiment, and various modifications in design may be made without departing from the spirit and scope of the invention defined in claims.

What is claimed is:

1. An automatic switchover device for a power source, comprising:

a switching unit which has first and second individual contacts individually leading to a regular power source system and an engine generator, and a common contact leading to an electric load, wherein the common contact can be alternatively electrically connected to the first and second individual contacts, and a control unit for controlling said switching unit in such a manner that said common contact is electrically connected to the second individual contact in response to said regular power source system being electrically failed, and said common contact is electrically connected to the first individual contact in response to the restoration of said regular power source system, wherein said switching unit includes:

a seesaw-type turn member carried on a support frame for turning movement between a first turned position in which the turn member permits said common contact to be electrically connected to the first individual contact and a second turned position in which the turn member permits said common contact to be electrically connected to the second individual contact, a spring member for exerting a spring force for retaining said turn member in one of the first and second turned positions in response to the turning movement of said turn member passing through a central point between said first and second turned positions toward one of said first and second turned positions, a first solenoid capable of exerting an electromagnetic force for driving said turn member toward the first turned position against the spring force of said spring member, and a second solenoid capable of exerting an electromagnetic force for driving said turn member toward the second turned position against the spring force of said spring member, said first and second solenoids each including a plunger which integrally comprises an operating portion enabling said plunger to be pushed in from the outside.

2. An automatic switchover device for a power source according to claim 1, wherein said common contact is provided on a movable contact-supporting member which is operably connected to said turn member for turning movement about an axis coaxial with said turn member, and said switching unit is accommodated in a box body having an opening capable of being opened and closed by a lid member in such a manner that said operating portions are disposed on the side of the opening, and said turn member and said movable contact-supporting member are disposed on the side opposite from the opening.

3. An automatic switchover device for a power source according to claim 2, wherein said common contact is provided at each of opposite ends of said movable contact-supporting member; said first and second individual contacts capable of being electrically connected to said common contact are fixedly disposed at locations corresponding to the opposite ends of said movable contact-supporting member; first and second power source terminal members individually connected to said regular power source system and said engine generator are connected to said first and second individual contacts; and a load terminal member leading to the electric load and fixedly disposed at a location corresponding to a central portion of said movable contact-supporting member is connected to said common contact.

* * * * *